United States Patent
Nottage

(10) Patent No.: US 10,663,765 B2
(45) Date of Patent: *May 26, 2020

(54) CUSTOMIZABLE EYEGLASS SYSTEM AND METHOD OF USE

(71) Applicant: Santana L. Nottage, Owings Mills, MD (US)

(72) Inventor: Santana L. Nottage, Owings Mills, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 15/786,330

(22) Filed: Oct. 17, 2017

(65) Prior Publication Data

US 2018/0039098 A1 Feb. 8, 2018

Related U.S. Application Data

(63) Continuation-in-part of application No. 15/247,582, filed on Aug. 25, 2016, now Pat. No. 9,817,247.
(Continued)

(51) Int. Cl.
*G02C 1/00* (2006.01)
*G02C 7/08* (2006.01)
(Continued)

(52) U.S. Cl.
CPC .............. *G02C 7/086* (2013.01); *G02C 1/10* (2013.01); *G02C 7/088* (2013.01); *G02C 7/10* (2013.01);
(Continued)

(58) Field of Classification Search
CPC .......... G02C 7/12; G02C 5/045; G02C 7/024; G02C 7/027; G02C 7/061; G02C 7/086;
(Continued)

(56) References Cited

U.S. PATENT DOCUMENTS 4,826,308 A 5/1989 Sadun
4,948,244 A 8/1990 Jones
(Continued)

FOREIGN PATENT DOCUMENTS

CN 102466894 5/2012
CN 103576339 2/2014
(Continued)

OTHER PUBLICATIONS

US 9,720,528 B2, 08/2017, Reyes (withdrawn)
(Continued)

*Primary Examiner* — Hung X Dang
(74) *Attorney, Agent, or Firm* — Law Office of Mark Brown, LLC; Christopher M. DeBacker

(57) ABSTRACT

A customizable eyeglass system for use in any remote situation, and which is ideal for use in third-world countries or areas where electrical power and typical machinery for manufacturing eyeglasses is lacking. The system includes a frame with receivers for the temples to connect into and lock into place. A pair of customizable lenses is connected to the front of the frame. The lenses can be rotated to dial in the correct prescription for the patient and then locked into place as well. Thus the invention corrects near and distance vision while also correcting astigmatism. If adjustments need to be made, the patient can easily unlock the lenses, rotate them to a proper orientation for proper sight, and then lock the lenses into place again.

10 Claims, 12 Drawing Sheets

Related U.S. Application Data

(60) Provisional application No. 62/373,940, filed on Aug. 11, 2016, provisional application No. 62/257,723, filed on Nov. 20, 2015.

(51) Int. Cl.
*G02C 7/10* (2006.01)
*G02C 13/00* (2006.01)

(52) U.S. Cl.
CPC ....... *G02C 13/001* (2013.01); *G02C 2200/06* (2013.01); *G02C 2200/08* (2013.01)

(58) Field of Classification Search
CPC .......... G02C 9/00; G02C 7/068; G02C 7/102; G02C 2200/08; G02C 2202/16; G02C 7/022; G02C 7/104
USPC ...... 351/49, 54, 47, 159.07, 159.22, 159.78, 351/41, 158
See application file for complete search history.

(56) References Cited

U.S. PATENT DOCUMENTS

| | | | |
|---|---|---|---|
| 5,088,809 A | 2/1992 | Portney | |
| 5,104,214 A | 4/1992 | Sims | |
| 5,249,002 A | 9/1993 | Chou et al. | |
| 5,485,227 A | 1/1996 | Lin | |
| 5,739,959 A | 4/1998 | Quaglia | |
| 6,290,354 B1 | 9/2001 | Safran | |
| 6,386,702 B1 | 5/2002 | Maloncon | |
| 7,142,369 B2 | 11/2006 | Wu et al. | |
| 7,325,922 B2 | 2/2008 | Spivey | |
| 7,338,159 B2 | 3/2008 | Spivey | |
| 7,372,646 B2 | 5/2008 | Spivey | |
| 7,484,842 B2 | 2/2009 | Brzozowski | |
| 7,717,552 B2 | 5/2010 | Spivey | |
| 7,789,508 B2 | 9/2010 | Padula et al. | |
| 8,157,375 B2 | 4/2012 | Cronin et al. | |
| 8,721,070 B2 | 5/2014 | Loeb, Jr. et al. | |
| 8,857,990 B2 | 10/2014 | Spivey et al. | |
| 8,888,276 B2 | 11/2014 | Kurtin et al. | |
| 9,470,907 B2 | 10/2016 | Esmaeili | |
| 9,470,908 B1 | 10/2016 | Frankel et al. | |
| 9,606,374 B2 | 3/2017 | Bush | |
| 9,778,491 B2 | 10/2017 | Rinella | |
| 9,817,247 B2 * | 11/2017 | Nottage | G02C 7/088 |
| 2002/0181123 A1 | 12/2002 | Han | |
| 2004/0120035 A1 | 6/2004 | Hoffman | |
| 2004/0246439 A1 | 12/2004 | Petroccione | |
| 2005/0213220 A1 | 9/2005 | Meyer | |
| 2009/0323208 A1 | 12/2009 | Kurosawa | |
| 2010/0014170 A1 | 1/2010 | Shyu | |
| 2011/0032477 A1 | 2/2011 | Ohanesian et al. | |
| 2012/0147316 A1 | 6/2012 | Loeb, Jr. et al. | |
| 2013/0141690 A1 | 6/2013 | Taylor et al. | |
| 2013/0194435 A1 | 8/2013 | Lupher et al. | |
| 2016/0004102 A1 | 1/2016 | Nisper et al. | |
| 2016/0124247 A1 | 5/2016 | Lamorte et al. | |
| 2016/0349533 A1 | 12/2016 | Grassi | |
| 2017/0146825 A1 | 5/2017 | Nottage | |
| 2017/0199398 A1 | 7/2017 | Bush | |
| 2017/0242270 A1 | 8/2017 | Crosby et al. | |

FOREIGN PATENT DOCUMENTS

| | | |
|---|---|---|
| WO | 2016132373 | 8/2016 |
| WO | 2017007191 | 1/2017 |
| WO | 2017120475 | 7/2017 |

OTHER PUBLICATIONS

"PCT/US2017/057231, "International Search Report and Written Opinion", dated Jan. 12, 2018".
"International Search Report and Written Opinion, PCT/US2018/047069, dated Nov. 5, 2018".

* cited by examiner

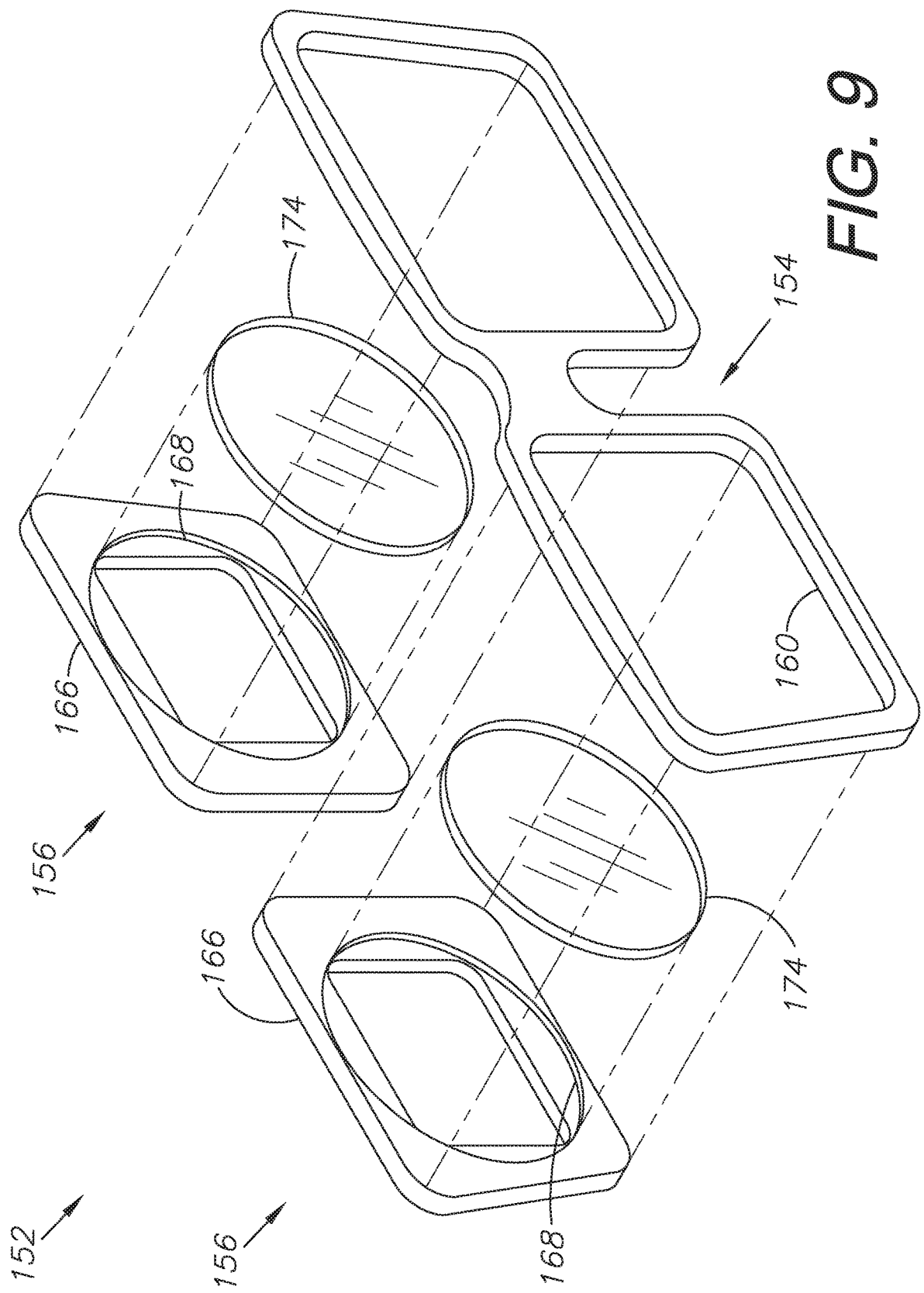

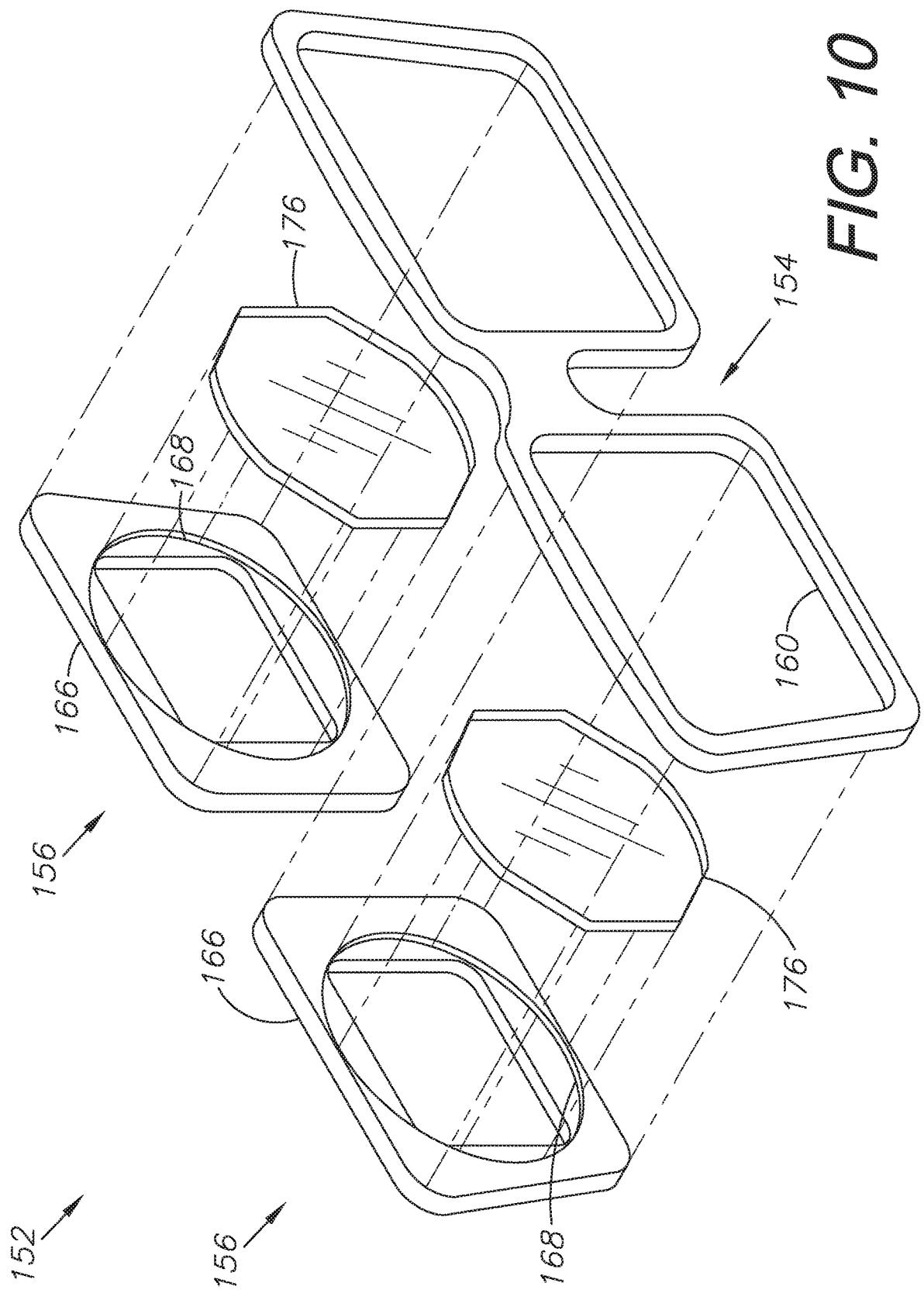

CUSTOMIZABLE EYEGLASS SYSTEM AND METHOD OF USE

CROSS-REFERENCE TO RELATED APPLICATIONS

This application is a continuation-in-part of and claims priority in U.S. patent application Ser. No. 15/247,582, filed Aug. 25, 2016, now U.S. Pat. No. 9,817,247, which claims priority in U.S. Provisional Patent Application No. 62/373,940, filed Aug. 11, 2016, as well as U.S. Provisional Patent Application No. 62/257,723, filed Nov. 20, 2015, all of which are incorporated herein by reference.

BACKGROUND OF THE INVENTION

1. Field of the Invention

The present invention relates generally to eyeglasses and a method for use thereof, and more specifically to customizable eyeglasses with adjustable lenses.

2. Description of the Related Art

Existing techniques for making and prescribing eyeglasses is costly and time consuming. Eyeglass manufacturing takes anywhere from ten minutes to an hour with a standard machine called a Lens Edger, and that machine can cost anywhere from $25,000 to over $100,000. The machine requires electricity and a reliable facility to operate in. This limits its usefulness in situations such as in third-world countries or remote locations.

What is needed is an affordable, highly-customizable, and easily adjustable eyeglass system which can be used in any situation, and is especially useful for remote and poor locales.

Heretofore there has not been available a system or method for an eyeglass customization system with the advantages and features of the present invention.

BRIEF SUMMARY OF THE INVENTION

The present invention generally provides a customizable eyeglass system for use in any remote situation, and which is ideal for use in third-world countries or areas where electrical power and typical machinery for manufacturing eyeglasses is lacking.

The system generally includes several parts which can easily be fit together from a kit of standard parts to form customized eyeglasses for a patient. The system includes a frame with receivers for the temples to connect into and lock into place. A pair of customizable lenses is connected to the front of the frame. The lenses can be rotated to dial in the correct prescription for the patient and then locked into place as well. If adjustments need to be made, the patient can easily unlock the lenses, rotate them to a proper orientation for proper sight, and then lock the lenses into place again.

BRIEF DESCRIPTION OF THE DRAWINGS

The drawings constitute a part of this specification and include exemplary embodiments of the present invention illustrating various objects and features thereof.

FIG. 9 is a three-dimensional exploded isometric view of another alternative embodiment of the present invention.

FIG. 10 is another three-dimensional exploded isometric view thereof, shown with an alternative lens element.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Eyeglass System 2

Figure 1:
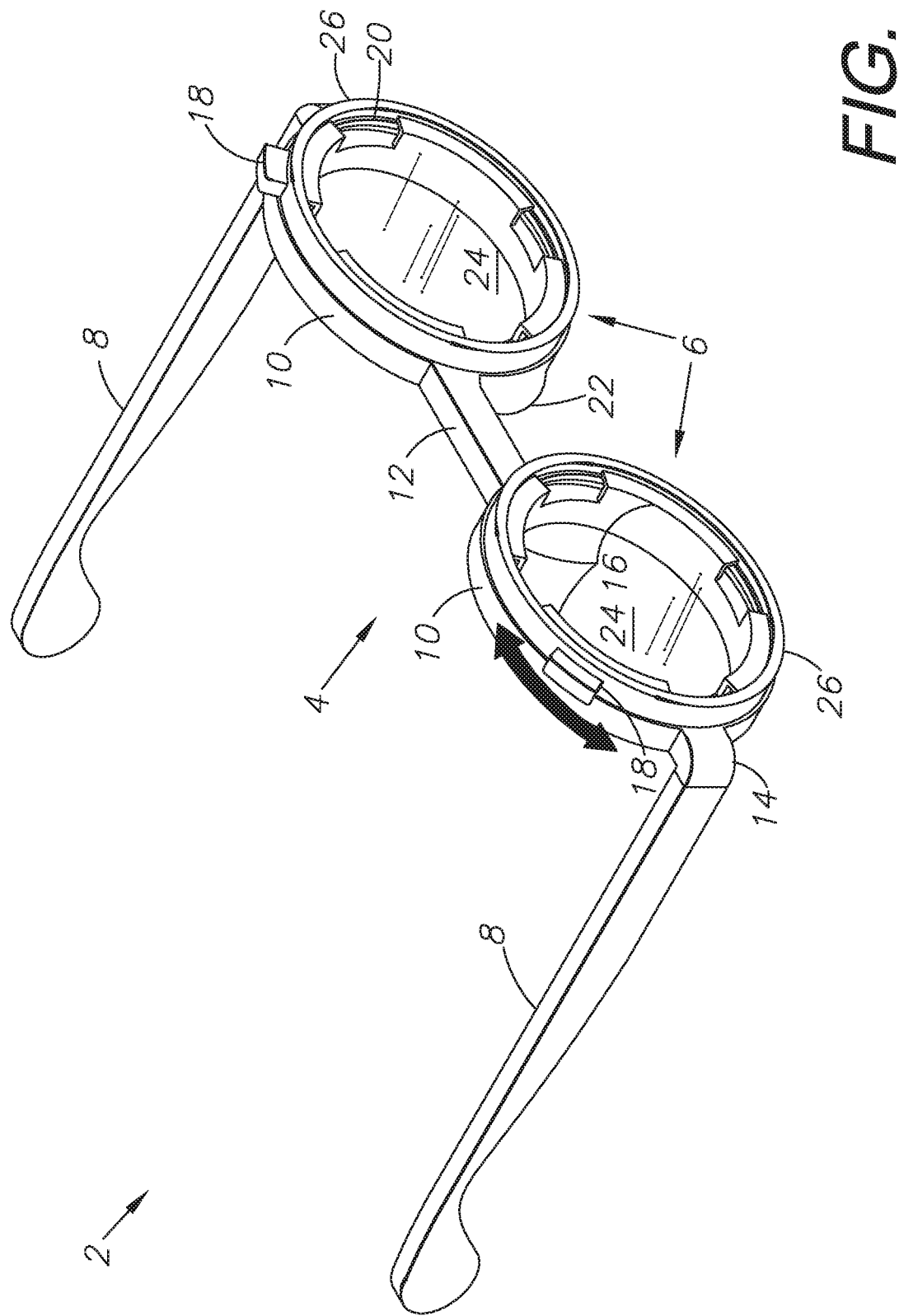
FIG. 1 is a three-dimensional isometric view of a preferred embodiment of the present invention.
Figure 2:
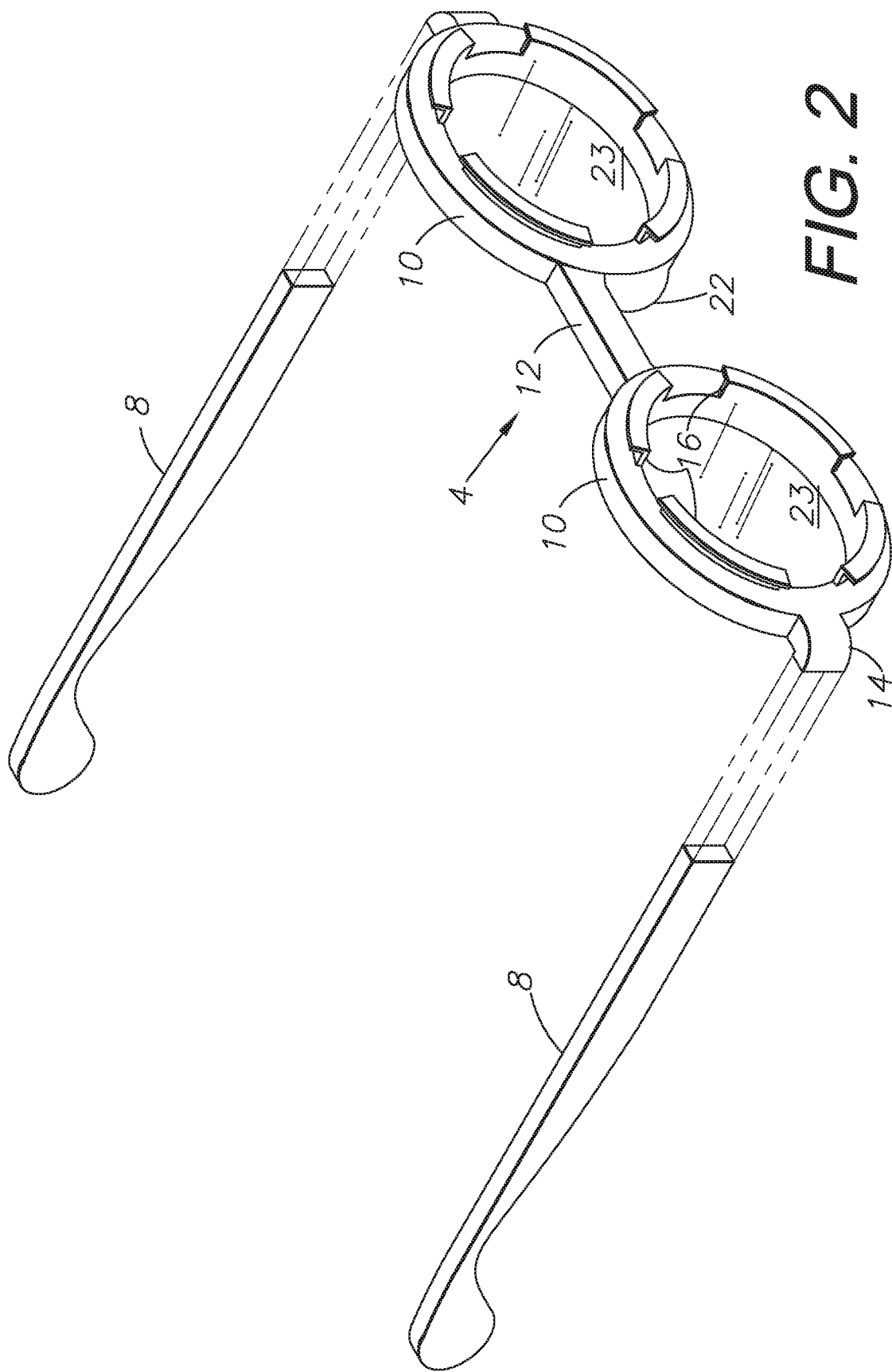
FIG. 2 is a partially exploded view thereof.
Figure 3:
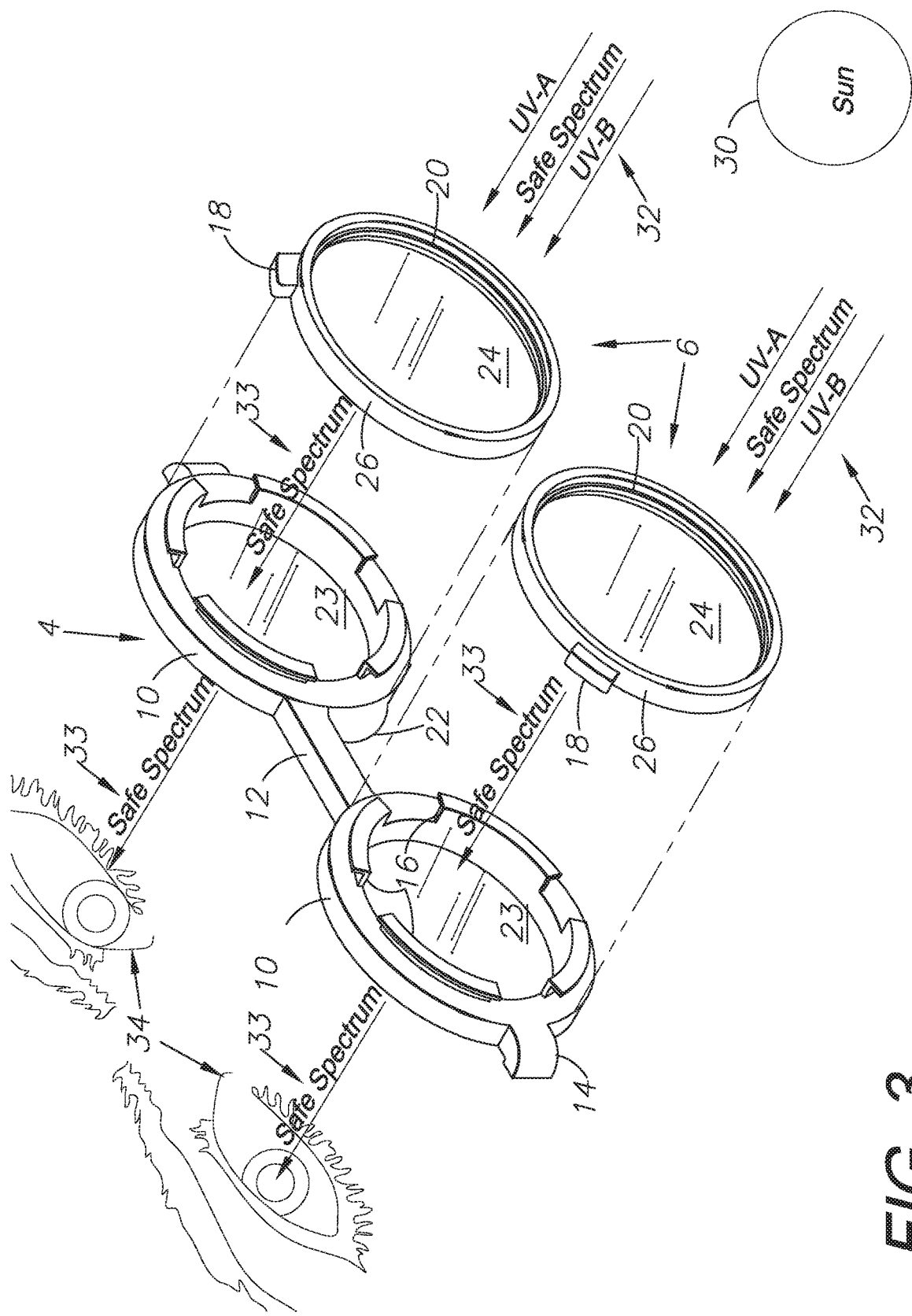
FIG. 3 is another partially exploded view of FIG. 1.
Figure 4:
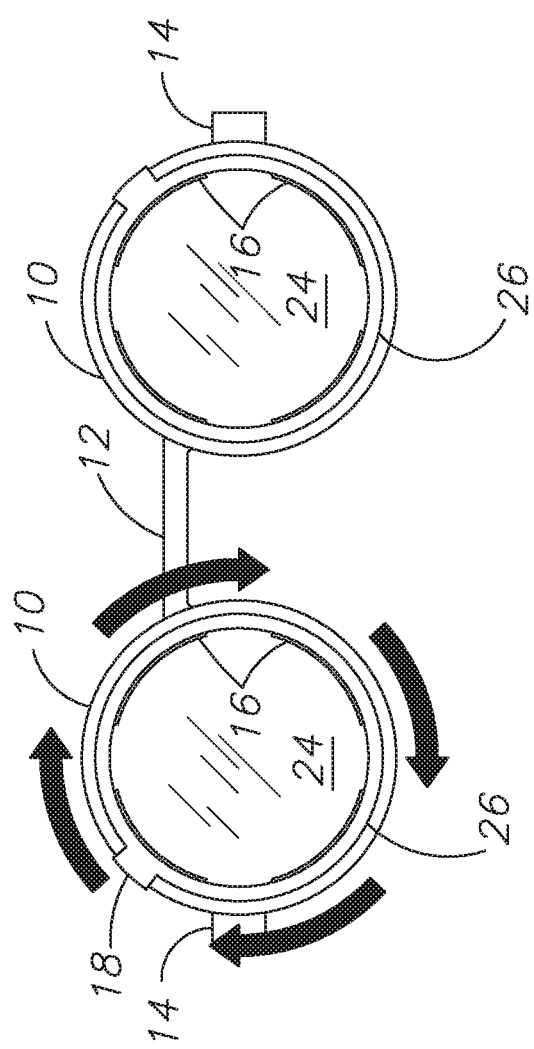
FIG. 4 is a front elevation view of the embodiment of FIG. 1.
Figure 5:
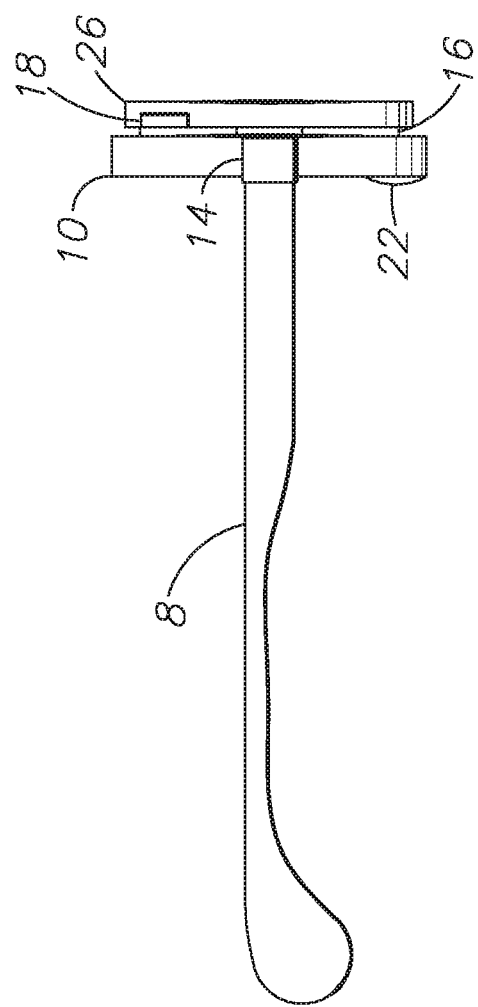
FIG. 5 is a side elevation view thereof.
Figure 6:
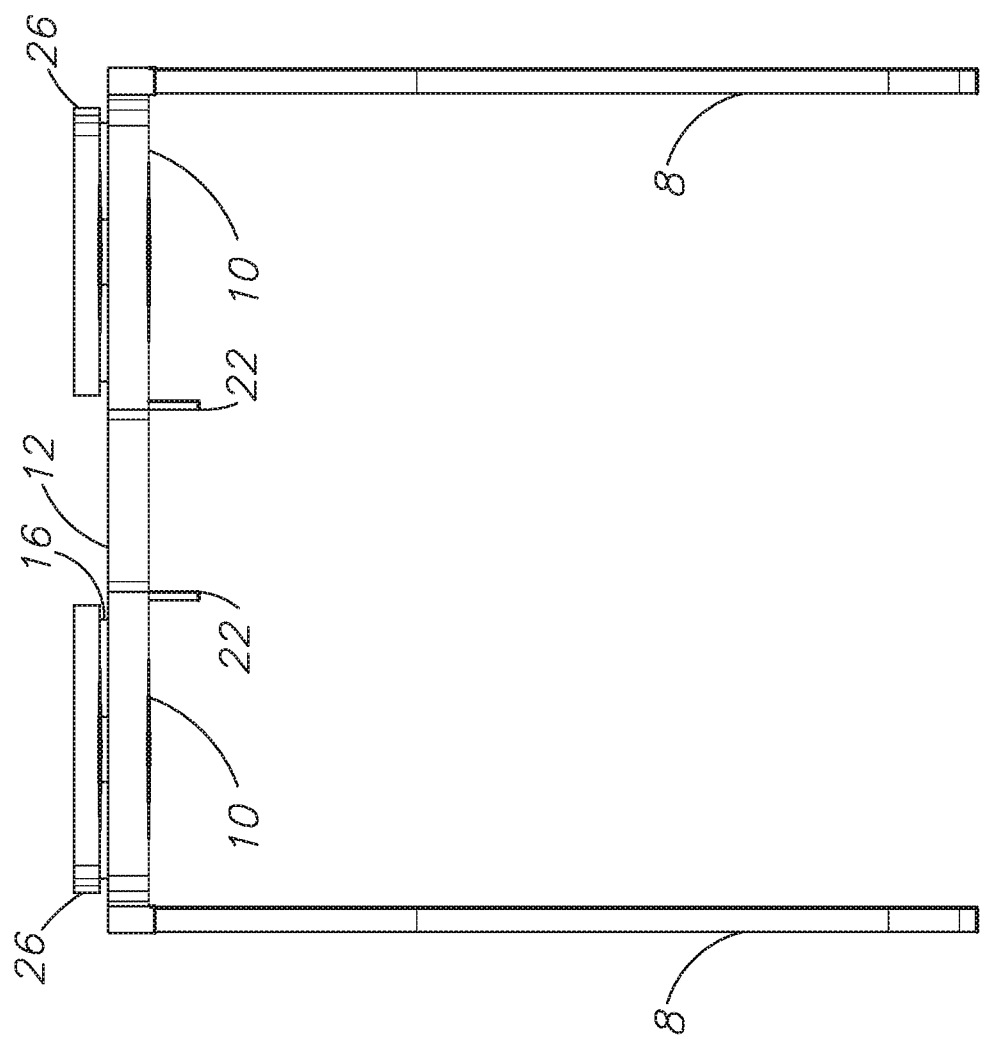
FIG. 6 is a bottom plan view thereof.

As shown in the figures, the preferred embodiment eyeglass system 2 generally includes a frame element 4, two temples 8, and two lens assemblies 6. The frame generally includes two circular lens-receivers 10 joined together by a bridge 12. Each lens-receiver 10 includes a nose piece 22 and a temple receiver 14. FIGS. 2 and 3 show that the lens-receivers 10 each have a first lens 23, and the lens assembly 6 has a second lens 24. The first lens 23 is typically a sphere lens, which is prescribed to correct distance vision of a patient, whereas the second lens 24 is intended to correct astigmatism.

Each lens assembly 6 connects to the lens-receiver 10 by locking a rim 20 running around the inside of the lens body 26 into locking grooves 16 which are part of the lens receivers 10. The grooves 16 allow the lens assemblies 6 to freely rotate along the rim 20. The lens bodies 26 each house the second lens 24, which focuses depending on the rotation of the lens assembly 6, thereby correcting a user's vision. Each lens assembly 6 also includes a tab 18 which makes it easy for the user or the user's eye doctor to rotate the lens assembly. The tab 18 then can be depressed or slid or otherwise adjusted such that it locks the lens assembly 6 into place, preventing further rotation until the tab 18 is unlocked. The second lens 24 has approximately 180 different points of correction addressing any users that requires astigmatism correction, such that while rotating the lens, the user will see their vision change until it is clear, at which point the user will stop rotating the lens assembly 6. The two lenses 23, 24 combine to fully correct a user's vision.

In this way, anyone be it an eye care professional or any average citizen can quickly assemble a customized pair of corrective eyeglasses in any location in the world, including very remote or very poor locations. By combining pre-constructed pieces, including the temples 8, frame 4, and lens assemblies 6, the eyeglasses can be customized to fit any users' face and adjusted to correct any users' vision.

In a method of practice, a user or eye-doctor/optometrist will prescribe the user a first lens 23 prescription. These will also be available in color-coded grades to help with illiterate persons when choosing replacement lenses and frames for damaged or lost eyeglasses. Once the frame 4 is fit with the first lens 23, the second lens 24, housed in the lens assembly 6, shall be placed on top. Once installed, the user can dial in the second lens 24 by rotating the lens assembly 6 until their astigmatism is corrected. If the tab 18 can be activated to lock the lens assembly 6 into place, the user may do so at that time.

Each lens 23, 24 in the preferred embodiment of the present invention includes 2 sets of lenses that have 100% ultra-violet light ("UV") protection as well as a 15% tint coating. This triple UV filtering action can help to prevent multiple eye and skin diseases, including Pterygia, Pinguecula, cataracts, retinal damage including macular degeneration, and cancers such as melanoma or eyelid skin cancers including basal cell carcinoma and squamous cell carcinoma. The present invention is intended to prevent all such diseases as a result of UV damage. Approximately more than half of all malignant melanoma is directly correlated to UV radiation.

The first set of lenses 24 have a 100% UV protective coating applied to a surface of that lens. A 15% gray tint is also applied to that lens surface which filters out harmful radiation as well as harmful UV rays. The 15% tint also reduces blue light effects which can damage vision and result in loss of sight.

The second set of lenses 23 provides a third level of protection. They have a protective 100% UV coating similar to that applied to the first set of lenses 24. In the event of prolonged exposure to high levels of UV light, this third level of protection will protect against any rays that somehow pass through the first set of lenses 24, or rays that somehow reflect around the first lenses.

FIG. 3 shows this feature in detail. Light 32 is emitted from the sun 30 in several spectrums, including UV-A, UV-B, and the safe spectrum. As UV rays pass through the first set of lenses 24, the harmful UV-A and UV-B rays are removed, and light 33 passes along to the second set of lenses 23 only in the safe spectrum. The second set of lenses 23 also filters out any harmful UV-A and UV-B rays which may have passed around the edges of the first set of lenses 24, and only the safe spectrum light 33 is allowed to pass on to the eyes 34 of the user.

It should be noted that, while the example above shows round glasses frames and lens assemblies, it is possible to use the present invention in any shape of frame and lens. In other embodiments, a portion of the second lens may rotate within an otherwise differently shaped lens body, thereby creating the same result as described above.

III. Alternative Embodiment Replacement Lens System 102

An alternative to the entire eyeglass system 2 above, a replacement lens system 102 can have the same results of an easy, affordable, and adjustable vision correction system without requiring special frames. The replacement lens system 102 as shown in FIGS. 7-8 in various arrangements can be used with existing, off-the-shelf eyeglass frames.

Figure 7:
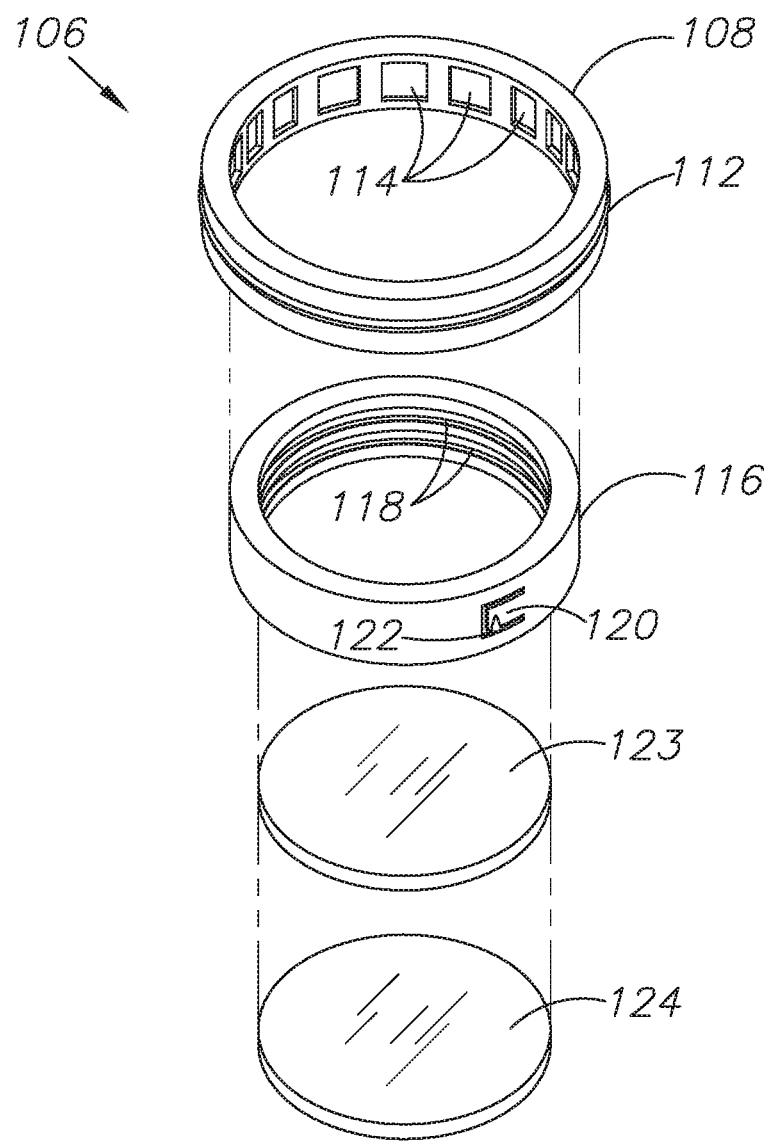
FIG. 7 is a three-dimensional exploded isometric view of an alternative embodiment of the present invention.
Figure 8:
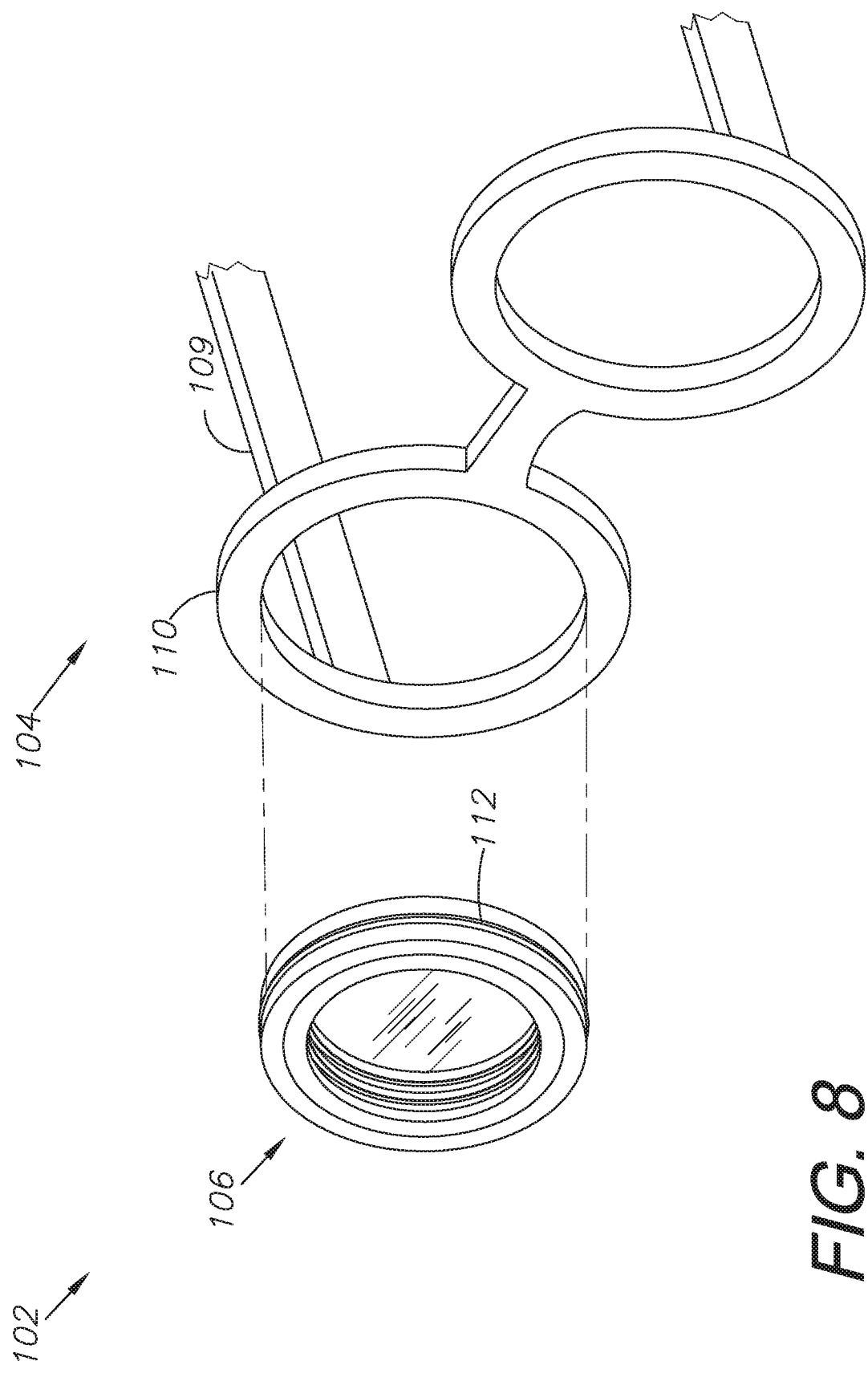
FIG. 8 is a three-dimensional isometric view thereof, shown in combination with a glasses frame environment.

FIG. 7 shows a circular lens element 106 which is constructed from an outer ring 108, an inner ring 116, a first lens 123 and a second lens 124. The two lenses 123, 124 fit into separate grooves 118 within the inner ring 116. The inner ring includes a flexing tab 120 with a nodule 122 which allows it to be interlocked into the upper ring 108 such that the flexing tab 120 locks into a track 114 on the inside of the outer ring 108. The flexing tab 120 and nodule 122 allow the inner ring to be rotated within the outer ring to adjust the prescription provided by the two lenses 123, 124, however without external force, the nodule 122 locks the inner ring 116 in place within the track 114 of the outer ring 108. The outer ring also has a rim 112 for locking the outer ring into a glasses frame 114, as shown in FIG. 8. The glasses frame 104 has a lens-receiving frame portion 110 and a pair of temples 109.

IV. Alternative Embodiment Replacement Lens System 152

FIG. 9 shows a slightly alternative embodiment replacement lens system 152 using a square glasses frame 154. Here, a frame insert 166 and lens 174 make up a lens element 156 which can be inserted into the frame 154 at the lens portion 160 of the frame. The lens 174 is inserted into a receiver slot 168 on the back of the frame insert 166 and locks in place, but can be rotated as needed. The lens 174 as shown in FIG. 9 is round, as above, and can be rotated to adjust vision correction. A second lens may or may not be used on the outside of the lens element 156, and may be a typical lens shaped the size of the frame 154 lens portion 160.

Figure 12:
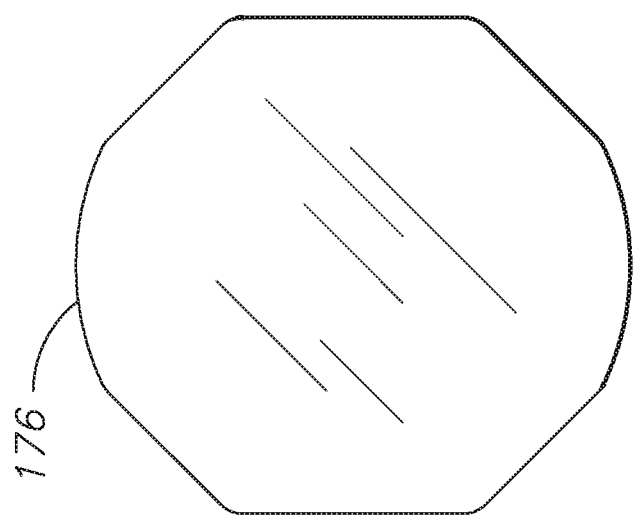
FIG. 12 is a front elevational view of another lens element.
Figure 11:
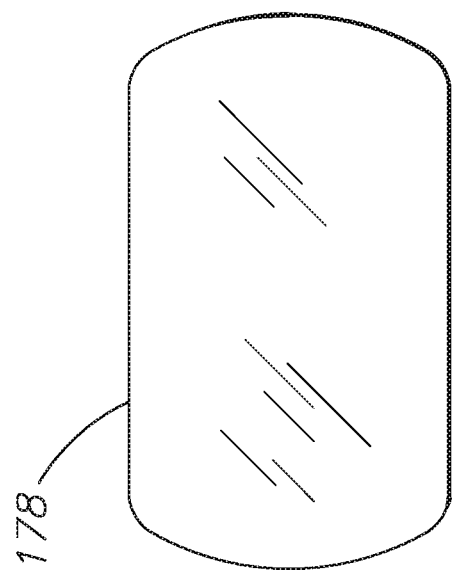
FIG. 11 is a front elevational view of the lens element of FIG. 10.
Figure 13:
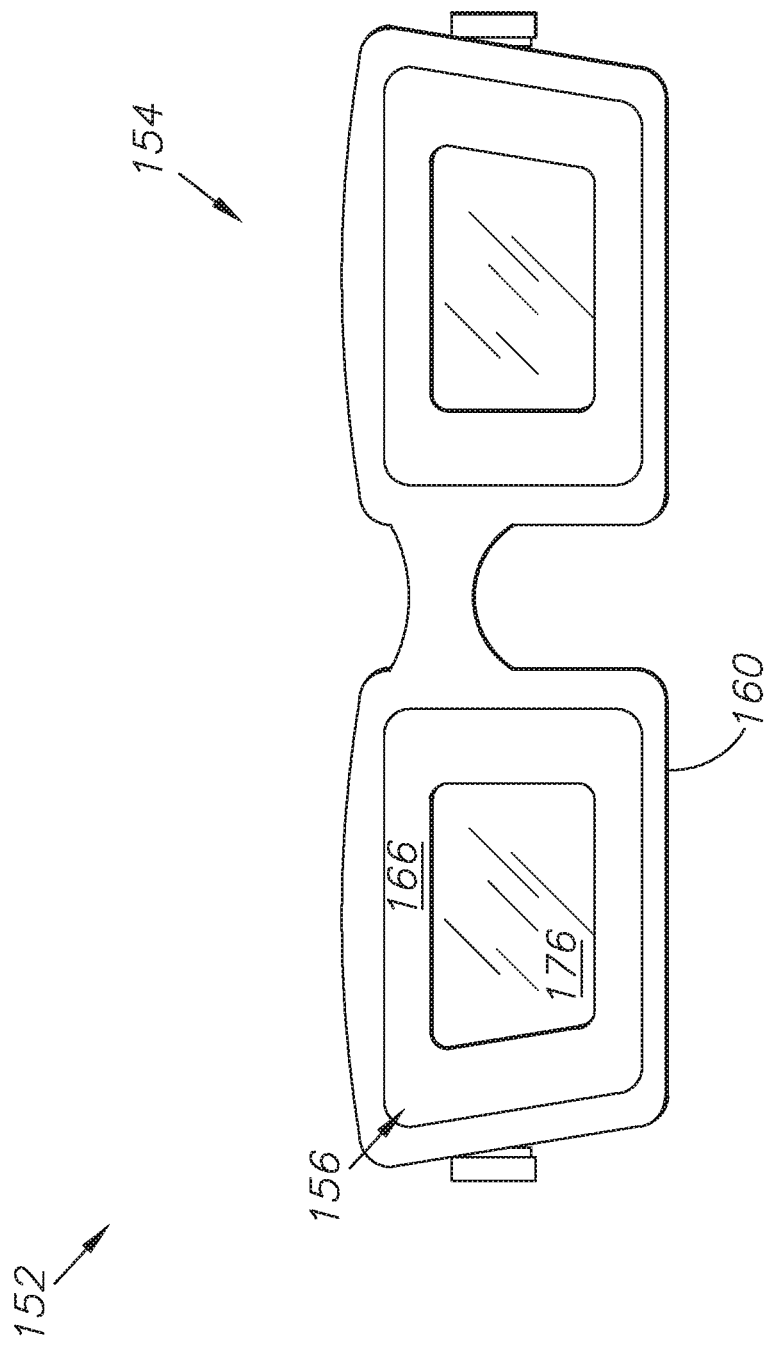
FIG. 13 is a front elevational view of the embodiment of FIG. 10.

FIG. 10 shows a similar arrangement, except a squared lens 176 with rounded potions is slotted into the receiver slot 168 of the frame insert 166. FIG. 11 shows a front elevational view of this squared lens 176, whereas FIG. 12 shows an alternative squared lens 178 which may also be used. FIG. 13 shows how this assembly would look from a frontal view.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A customizable eyeglass system comprising:
   a frame having two lens receivers connected by a bridge, each lens receiver including a temple receiver;
   a pair of temples configured to be received by said temple receivers of said two lens receivers;
   a pair of removable lens assemblies configured to engage said two lens receivers such that each of said pair of lens assemblies may rotate freely independent of the other; and
   whereby rotation of said lens assemblies adjusts the second lenses housed within said lens assemblies, and whereby said adjustment is configured to correct eyesight.

2. The system of claim 1, further comprising:
   each of said pair of removable lens assemblies comprising an inner ring, an outer ring, and a pair of lenses;
   said inner ring including grooves for receiving said pair of lenses;

said inner ring further including a flexible tab for being received within a rack on an inner surface of said outer ring;

said outer ring configured to be connected within said lens receivers; and whereby said inner ring is rotatable within said outer ring.

3. The system of claim 2, further comprising:

wherein each said first pair of lenses are a spherical lens configured for correcting near and distance vision; and wherein each said second pair of lenses are configured for treating astigmatism and contains at least 180 different points of correction.

4. The system of claim 2, further comprising:

said outer ring including protruding locking ridge extending away from said outer ring; and said locking configured to lock said lens assembly into said lens receiver.

5. The system of claim 2, further comprising:

said pair of lenses comprising a first lens and a second lens;

said first lens having 100% UV protection; and said second lens having 100% UV protection and 15% tint.

6. The system of claim 1, further comprising:

each of said pair of removable lens assemblies comprising a lens receiver insert corresponding to the shape of said lens receiver;

a lens receiver slot within said lens receiver insert, said lens receiver slot configured to receive a lens; and whereby said lens is rotatable within said lens receiver slot.

7. The system of claim 6, wherein said lens receiver is generally rectangular in shape.

8. The system of claim 6, further comprising:

wherein each said first pair of lenses are a spherical lens configured for correcting near and distance vision; and wherein each said second pair of lenses are configured for treating astigmatism and contains at least 180 different points of correction.

9. The system of claim 6, further comprising:

a second pair of lenses placed within said lens receiver, whereby said each of said second lenses are placed in front of a respectable one of said removable lens assemblies.

10. The system of claim 9, further comprising:

said pair of lenses comprising a first lens and a second lens;

said first lens having 100% UV protection; and said second lens having 100% UV protection and 15% tint.

* * * * *